US008843642B2

(12) United States Patent
Shen et al.

(10) Patent No.: US 8,843,642 B2
(45) Date of Patent: *Sep. 23, 2014

(54) GESTURING TO SELECT AND CONFIGURE DEVICE COMMUNICATION

(71) Applicant: Microsoft Corporation, Redmond, WA (US)

(72) Inventors: Guobin Shen, Beijing (CN); Chunyi Peng, Beijing (CN); Yongguang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/732,432

(22) Filed: Jan. 1, 2013

(65) Prior Publication Data

US 2013/0122814 A1 May 16, 2013

Related U.S. Application Data

(63) Continuation of application No. 13/159,404, filed on Jun. 13, 2011, now Pat. No. 8,370,501, which is a continuation of application No. 12/131,122, filed on Jun. 2, 2008, now Pat. No. 7,991,896.

(60) Provisional application No. 61/046,504, filed on Apr. 21, 2008.

(51) Int. Cl.
| | |
|---|---|
| G06F 15/16 | (2006.01) |
| H04L 29/08 | (2006.01) |
| H04W 4/20 | (2009.01) |
| G06F 1/16 | (2006.01) |
| G06F 3/01 | (2006.01) |
| H04W 4/02 | (2009.01) |
| H04W 76/02 | (2009.01) |
| G01S 13/08 | (2006.01) |
| H04B 7/00 | (2006.01) |
| H04W 4/00 | (2009.01) |
| H04L 29/06 | (2006.01) |
| H04M 1/725 | (2006.01) |
| H04W 12/06 | (2009.01) |

(52) U.S. Cl.
CPC .......... *H04W 76/02* (2013.01); *H04M 2250/02* (2013.01); *H04L 67/14* (2013.01); *H04M 2250/12* (2013.01); *H04W 4/001* (2013.01); *H04L 63/0869* (2013.01); *H04W 4/206* (2013.01); *G06F 1/1694* (2013.01); *G06F 1/1698* (2013.01); *G06F 3/017* (2013.01); *H04M 1/7253* (2013.01); *H04M 2250/64* (2013.01); *H04W 4/023* (2013.01); *H04W 76/023* (2013.01); *H04M 2250/06* (2013.01); *H04W 4/026* (2013.01); *H04M 1/72544* (2013.01); *H04W 4/02* (2013.01); *H04W 12/06* (2013.01)
USPC ............................. 709/227; 342/47; 455/41.2

(58) Field of Classification Search
USPC ....................... 709/227; 342/47, 367; 345/156
See application file for complete search history.

(56) References Cited

U.S. PATENT DOCUMENTS

| 7,046,961 B2 | 5/2006 | Park | |
|---|---|---|---|
| 7,110,092 B2 * | 9/2006 | Kasper et al. | 356/4.01 |

(Continued)

OTHER PUBLICATIONS

Mayrhofer, "Shake Well Before Use: Authentication Based on Accelerometer Data", Proceedings of the 5th International Conference on Pervasive Computing, May 13-16, 2007.

(Continued)

*Primary Examiner* — David Lazaro
*Assistant Examiner* — Vitali Korobov
(74) *Attorney, Agent, or Firm* — Dan Choi; Carole Boelitz; Micky Minhas (57) ABSTRACT

Described is a technology by which a gesture made with a source device (e.g., a cellular telephone), such as a throwing or pointing motion, is used to automatically set up a connection with another device to which the gesture is directed. Audio signals output during the gesture, e.g., such as at the start and end of the gesture, are detected by candidate (listening) devices. The device having the least time difference between detection of the start and end signals is the device that is generally best aligned with the throwing or pointing motion, and thus may be selected as the target device. Once selected, a connection such as a network connection may be set up between the source device and the target device for further communication, such as for application data exchange.

20 Claims, 6 Drawing Sheets

(56) References Cited

U.S. PATENT DOCUMENTS

| | | | |
|---|---|---|---|
| 7,532,196 B2* | 5/2009 | Hinckley | 345/156 |
| 7,721,231 B2* | 5/2010 | Wilson | 715/863 |
| 2004/0179545 A1 | 9/2004 | Erola | |
| 2004/0203381 A1 | 10/2004 | Cahn | |
| 2005/0093868 A1* | 5/2005 | Hinckley | 345/502 |
| 2006/0050052 A1 | 3/2006 | Mekenkamp et al. | |
| 2006/0242259 A1 | 10/2006 | Vallabh et al. | |
| 2006/0256008 A1* | 11/2006 | Rosenberg | 342/367 |
| 2006/0256074 A1 | 11/2006 | Krum et al. | |
| 2006/0256082 A1 | 11/2006 | Cho | |
| 2006/0294247 A1 | 12/2006 | Hinckley et al. | |
| 2007/0124503 A1 | 5/2007 | Ramos et al. | |
| 2007/0146347 A1 | 6/2007 | Rosenberg | |
| 2007/0191028 A1 | 8/2007 | Hinckley et al. | |
| 2007/0249288 A1* | 10/2007 | Moallemi et al. | 455/68 |
| 2007/0264976 A1 | 11/2007 | Lessing et al. | |
| 2008/0204410 A1* | 8/2008 | Wilson | 345/158 |
| 2008/0204411 A1* | 8/2008 | Wilson | 345/158 |
| 2009/0104874 A1* | 4/2009 | Ellis | 455/41.2 |

OTHER PUBLICATIONS

Hinckley, "Sensing Techniques for Multi-Device Interfaces", accepted in UbiComp 2003, Oct. 12-15, 2003.

Tourrilhes, "Co-Link configuration: Using wireless diversity for more than just connectivity", Hewlett-Packard Company, Sep. 17, 2002.

Antoniou, "iTouch: RFID Middleware for Boosting Connectivity & Intuitive User Interaction in Smart Spaces", Nokia Research Center, May 9, 2006.

Uzun, "Usability Analysis of Secure Pairing Methods", Nokia Research Center, Jan. 10, 2007.

"Zero Configuration Networking (ZeroConf)", printed Jan. 18, 2008.

"Configuration Technologies: Windows Connect Now", Microsoft Corporation, printed Jan. 18, 2008.

PCT International Search Report and Written Opinion for Application No. PCT/US2009/041178, Nov. 30, 2009.

Peng, "BeepBeep: A High Accuracy Acoustic Ranging System using COTS Mobile Devices", Proceedings of the 5th International Conference on Embedded Networked Sensor Systems, Nov. 6-9, 2007.

Adya, "Architecture and Techniques for Diagnosing Faults in IEEE 802.11 Infrastructure Networks", Proceedings of the 10th Annual International Conference on Mobile Computing and Networking, Sep. 26-Oct. 1, 2004.

Balfanz, "Talking to Strangers: Authentication in Ad-Hoc Wireless Networks", Proceedings of the 9th Annual Symposium on Network and Distributed System Security, Feb. 6-8, 2002.

Bloom, "Space/Time Trade-offs in Hash Coding with Allowable Errors", Communications of the ACM, Jul. 1970.

Colombo, "Visual Capture and Understanding of Hand Pointing Actions in a 3-D Environment", IEEE Transactions on Systems, Man, and Cybernetics—Part B: Cybernetics, Aug. 2003.

Ford, "Persistent Personal Names for Globally Connected Mobile Devices", Proceedings of the 7th Symposium on Operating Systems Design and Implementation, Nov. 6-8, 2006.

Girod, "The Design and Implementation of a Self-Calibrating Distributed Acoustic Sensing Platform", Proceedings of the 4th ACM Conference on Embedded Networked Sensor Systems, Oct. 31-Nov. 3, 2006.

Goodrich, "Loud and Clear: Human-Verifiable Authentication Based on Audio", Proceedings of the 26th International Conference on Distributed Computing Systems, Jul. 4-7, 2006.

Heydt-Benjamin, "Vulnerabilities in First-Generation RFID-enabled Credit Cards", Proceedings of the 11th International Conference on Financial Cryptography and Data Security, Feb. 12-15, 2007.

Holmquist, "Smart-Its Friends: A Technique for Users to Easily Establish Connections between Smart Artefacts", Proceedings of the 3rd International Conference on Ubiquitous Computing, Sep. 30-Oct. 2, 2001.

Iba, "An Architecture for Gesture-Based Control of Mobile Robots", Proceedings of the IEEE/RSJ International Conference on Intelligent Robots and Systems, Oct. 1999.

Kehl, "Real-Time Pointing Gesture Recognition for an Immersive Environment", Proceedings of the 6th IEEE International Conference on Automatic Face and Gesture Recognition, May 17-19, 2004.

Lombardi, "Adding Gestures to Ordinary Mouse Use: a New Input Modality for Improved Human-Computer Interaction", Proceedings of the 14th International Conference on Image Analysis and Processing, Sep. 10-14, 2007.

Lopes, "Aerial Acoustic Communications", Proceedings of the IEEE Workshop on Applications of Signal Processing to Audio and Acoustics, Oct. 21-24, 2001.

Maroti, "Radio Interferometric Geolocation", Proceedings of the 3rd ACM Conference on Embedded Networked Sensor Systems, Nov. 2-4, 2005.

McCune, "Seeing-Is-Believing: Using Camera Phones for Human-Verifiable Authentication", Proceedings of the IEEE Symposium on Security and Privacy, May 8-11, 2005.

Nickel, "Visual recognition of pointing gestures for human-robot interaction", Image and Vision Computing, ScienceDirect, Dec. 3, 2007.

Keshav, "Cell Phones as a Research Platform", Panel, Proceedings of the 5th International Conference on Mobile Systems, Applications, and Services, Jun. 11-14, 2007.

Pocket PC Central, "Tutorial: Connect a Pocket PC to the Internet Using a Mobile Phone", earliest know publication date: Jul. 10, 2006.

Saxena, "Secure Device Pairing based on a Visual Channel", (Short Paper), Proceedings of the IEEE Symposium on Security and Privacy, May 21-24, 2006.

Shaked, "Cracking the Bluetooth PIN", Proceedings of the 3rd International Conference on Mobile Systems, Applications, and Services, Jun. 6-8, 2005.

Soriente, "HAPADEP: Human-Assisted Pure Audio Device Pairing", Proceedings of the 11th International Conference on Information Security, Sep. 15-18, 2008.

"The Bat System", Computer Laboratory Digital Technology Group, University of Cambridge, as archived on Feb. 22, 2008.

"Networking Bonjour" Apple Developer Connection, as archived on May 13, 2008.

"NFC Forum", as archived on Aug. 15, 2006.

Bluetoothtracking.org, as archived on Nov. 12, 2007.

Pebbles Personal Universal Control, "Using a Hand-Held as a Personal Universal Controller", The Pittsburgh Pebbles PDA Project, as archived on Oct. 10, 2007.

"Cricket Software Flashlight Project Page", as archived on Dec. 23, 2004.

UPnP™ Forum, as archived on Dec. 29, 2007.

"How to set up a Bluetooth connection", Nokia 5500 Sport support, as archived on Dec. 27, 2006.

* cited by examiner

GESTURING TO SELECT AND CONFIGURE DEVICE COMMUNICATION

BACKGROUND

The widespread popularity of mobile phones has led to increasing demands for locally networked applications and services between nearby users. Some examples include file sharing, mobile gaming, social networking and so forth. In general, such scenarios tend to occur in an unplanned, ad hoc setting, and often use a direct connection over appropriate local wireless interface such as Bluetooth® or Wi-Fi® rather than the slow and possibly expensive mobile telephone carrier's system.

By way of example, consider two users, Alice and Bob. Alice may want to share some data with Bob, such as a picture stored on her mobile telephone, which she can do by sending it to Bob's mobile telephone over Bluetooth or Wi-Fi.

However, is difficult to for most users to configure a network connection. For example, both Alice's phone and Bob's telephone may be Bluetooth®-enabled, however in the presence of many other devices, such as at a party, Alice cannot easily know which device is Bob's telephone among possibly many listed devices. As a more particular example, via Bluetooth®, Alice's telephone scans neighboring devices, which may find a lot of devices with basically meaningless names, like Dopodabc123, Nokia123456789 and so forth. Although Alice may physically see Bob's telephone, neither Alice nor her telephone knows from those names to which device it should connect, whereby Alice needs to have Bob inquire as to his telephone's name. Such an inquiry is not straightforward, especially with telephone models that do not provide a name-showing feature. Alternatively, Alice may start probing among all of the listed devices until Bob's telephone receives a file transfer request from some other device (likely, but not necessarily Alice's telephone). In either event, such procedures are difficult and/or tedious, whereby some users, and particularly non-technically-inclined users, will give up or not even bother with otherwise desirable data communication.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a source device selects a target device by a physical movement (gesture), after which the devices may automatically connect to one another. Candidate (listening) devices receive signals output from a source device, in which the signals correspond to a physical movement of that source device. The signals received at each device may be used to report data back to the source device that corresponds to a physical location of each candidate device. The source device may select a candidate device as a target device based on the reported data, and the devices may communicate to set up a network connection.

In one example, the candidate device detects audio output from the source device, including an audio signal associated with one part (e.g., at a start) of the physical movement and another audio signal associated with another part (e.g., at an end) of the physical movement. The time difference between these audio signals corresponds to the physical location of that candidate device. In general, the if the physical movement of the source device comprises a pointing or throwing gesture, the candidate device having the least time difference between the two signals is the device at which the source device was pointing towards during the gesture, whereby that candidate device may be selected as the target device.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards configuring a connection with a target device based upon device position, and a physical device movement with respect to that position. In general, the technology is based upon detecting device movement of a source device (e.g., corresponding to a particular gesture such as a soft throwing or pointing motion) that is interpreted as a user intention to select a particular target device and establish a connection with that device. As will be understood, this provides a generally natural, spontaneous, efficient and effortless solution to wireless connection issues.

Thus, one aspect of the technology described herein facilitates a spontaneous connection setup between a pair of devices, including when a target device is present among multiple nearby devices. Another aspect is directed towards automatic device selection, which leverages the source device's movement/gesture to infer a user's intention with respect to determining a target device among candidate devices. Confirmation and device authentication may be used, e.g., after device selection, a notification informs end-users that the expected devices are about to set up a connection; for example, this may be a verification procedure of the above selection operation, possibly followed by credential-based authentication. Automatic connection setup is another aspect that may be implemented, e.g., once a target device is identified, known automatic configuration and setup technology may be used to establish a connection, such as via a Wi-Fi or Bluetooth® communication channel between those devices.

In general, inexpensive and widely available sensors such as microphones and speakers, which are already present on mobile telephones, may be used to detect the user-initiated gesture. Based upon the aimed direction of the gesture, as determined by timing, the appropriate source device and intended target device can automatically establish a connection.

While many of the examples described herein are directed towards a mobile telephone as a source device, it can be readily appreciated that any reasonably portable computing device may act as a source. Further, while audio is used as a gesture sensing mechanism, which is particularly beneficial because the speed of sound is relatively slow compared to the speed of electromagnetic radiation, it is understood that any appropriate type of output mechanism and corresponding sensor may be used. Further, while many of the examples are directed towards a mobile telephone as a target device, any other computing device having communication capabilities such as a personal computer, laptop, personal digital assistant, printer and so forth may act as a target device.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing, networking and/or data communication in general.

Figure 1:
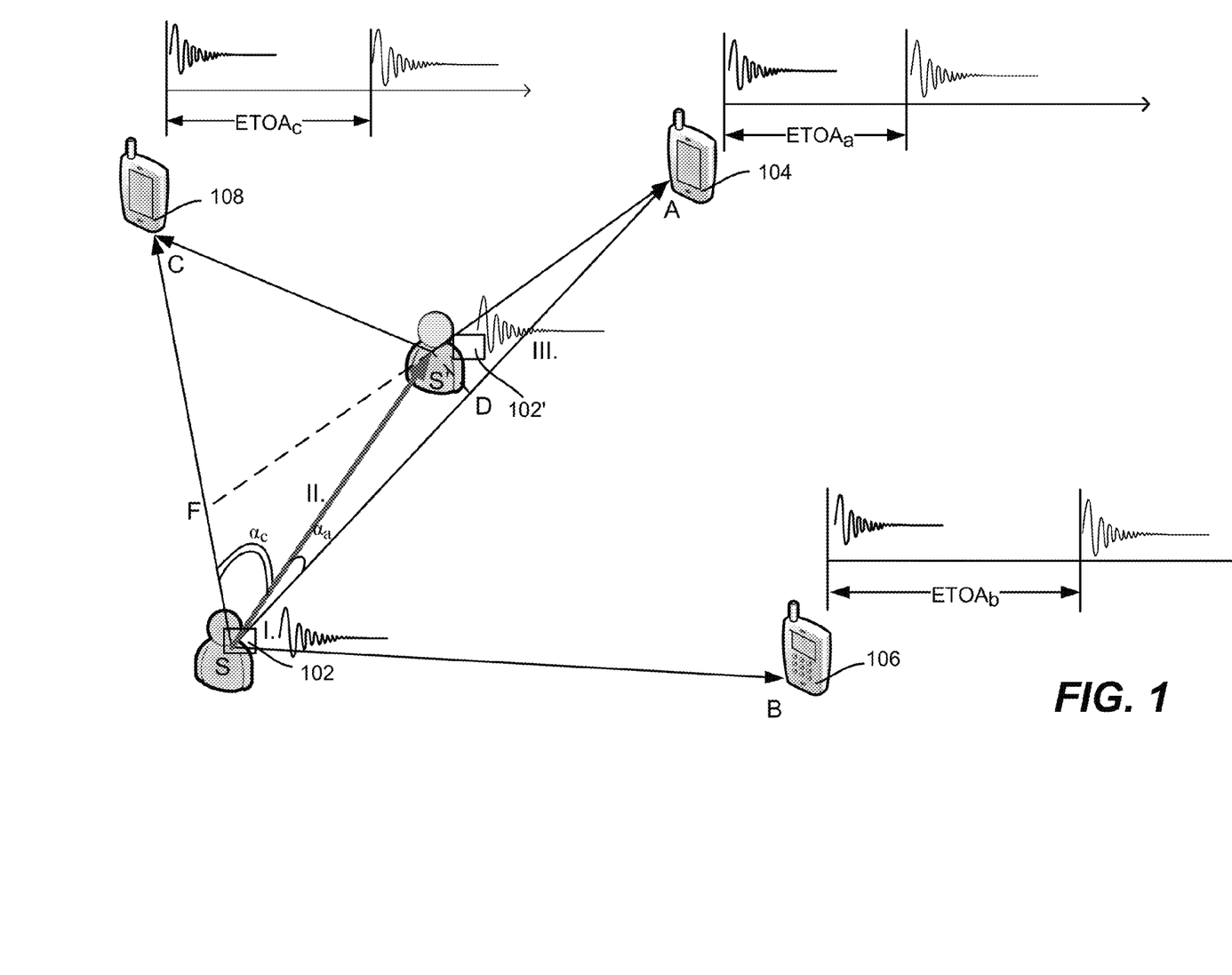
FIG. 1 is a representation of a user gesturing with a source device to select a target device in an environment in which multiple candidate target devices (listening devices) are present.

Turning to FIG. 1, there is shown a representation of a number of mobile devices and users, in which motion-based and position-based connectivity is provided in a manner that does not require any other knowledge at the source device of the target device. In general, a user S with a source device 102 wants to establish a connection with another user A (with a corresponding device 104) in an environment such as a party in which other users B and C with respective corresponding devices 106 and 108 are nearby A.

In FIG. 1, there are two representations of the user, namely S and S' corresponding to the source device 102 and 102' at different positions during the physical movement. In one example this is approximately at the start of the gesture (the device at 102) and at the end of the gesture (the same device at 102'), to provide a larger distance/time separation between signals. Note that in FIG. 1 (and FIG. 4, described below), the distances shown between s, s', A, B, and C are not intended to represent actual relative distances nor any particular scale, although having a sufficiently distinct angles facilitates one way to detect user intent as to selection of a target device, as described below.

When the source device 102 is pointed toward A (device 104), it emits acoustic signals, e.g., including a first signal just before or at the beginning of the movement (e.g., at block 102), and a second at the end of or just after the movement (e.g., at block 102'). Note that while an audible acoustic signal (beep) is used as one example herein, it is alternatively feasible to use other types of signals, such as ultrasonic, supersonic and/or subsonic frequencies, alone or in any combination. Different and/or variable pulses, intensities, frequencies and so forth may be used, and combined, e.g., the acoustic signal may be one that varies from a higher to a lower frequency over time, or vice-versa, an/or may be continuous or stepped, or some combination thereof. The first and second signals may be different relative to one another in their characteristics (that is, not only differing in distance/timing).

Note that the source user S may trigger the signal emission of the signals, such as by pressing and releasing a button (or having the device automatically time the second signal) in conjunction with the pointing motion, although some automatic mechanism such as a motion sensing device may trigger or assist in triggering the signal emissions, such as upon automatically detecting the start and stop (or an estimated stop based on time) of an appropriate gesture. As another option, the signaling may begin immediately following an initialization phase, e.g., just after entering the gesturing mode that seeks a connection with a target device. Alternatively, a device may regularly emit pulsed signals, (e.g., when in a connection-seeking mode), with most of such signals discarded by recipients until the pulse pattern is detected as changing in a manner that is indicative of a particular movement corresponding to a gesture.

Note further that other movements are feasible. For example, a side-to-side/back-and forth gestures may be used, with the target device comprising the candidate device that is generally best centered with respect to the side-to-side movement. Timing computations, such as the least extreme difference variance between signal pairings, (and possibly in conjunction with signal strength data), may be used to distinguish the best-centered device. Gesture-like withdrawing/moving away from one device (e.g., along an alignment line) may also be detected, in contrast to a pointing-toward gesture. A more complex gesture with additional movement and/or movement direction(s) may be detected, such as by emitting additional sound signals during the movement. Various gestures may be mapped to various user intentions. Other movements are feasible, although in general, requiring too precise or too complex a motion as a gesture is undesirable.

In the example of FIG. 1, the receiving devices 104, 106 and 108, one of which is the desired target device (e.g., the device 104), have their microphones turned on, and can thus record these acoustic signals that the source device outputs. As described below, through time of arrival (TOA) detection, the different elapsed times of arrivals $ETOA_a$ $ETOA_b$ and $ETOA_c$ are obtained independently from any other device's time via the recording by each device. Using mathematical analysis described below with reference to FIG. 4, the target device 104, that is, the device aligned along (closest to) the movement direction, is the one having the lowest elapsed times of arrival. By communicating these elapsed time data among the multiple receiving devices and/or to the source device, the desired target device is thus (ordinarily) determinable.

Figure 2:
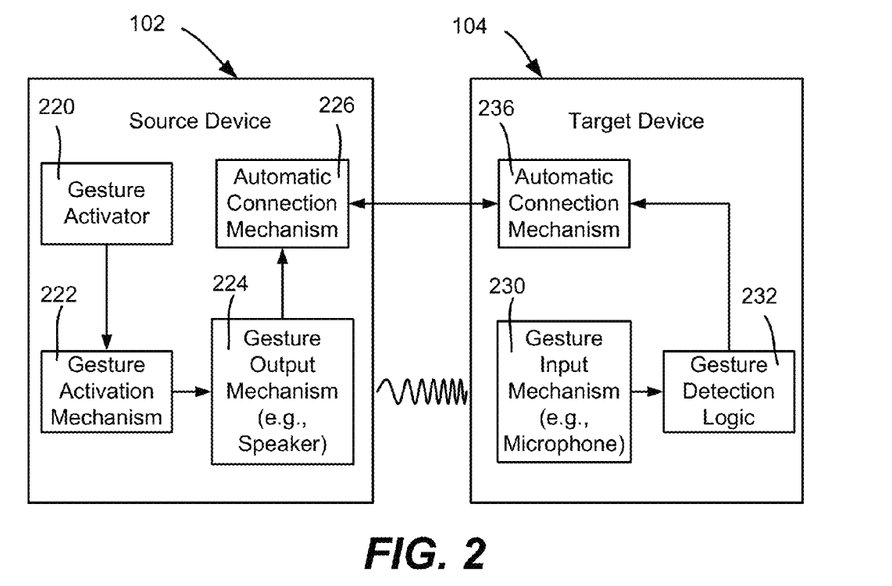
FIG. 2 is a block diagram representing example components within a source device and a target device for gesturing to select and configure device communication.

FIG. 2 shows example components of devices equipped with gesture-based connectivity technology, such as the source device 102 and the target device 104. A gesture activator 220 such as a button (and/or motion sensor) triggers a gesture activation mechanism 222 to drive a speaker 224. Note that the activation mechanism 222 may be as simple as an audio driver (e.g., including appropriate software and hardware) that outputs a tone to the speaker 224, or may be more complex, such as including timing logic and/or logic that computes an output signal based on motion sensing, depending on the type of input from the gesture activator 220.

The target device 104 receives the signal via an input mechanism 230, such as a microphone. In general, gesture detection logic 232 computes the elapsed time of arrival and may, for example, perform other functionality, such as to filter out noise and other unwanted signals. An automatic connection mechanism 236 of the candidate/target device 104 communicates with an automatic connection mechanism 226 of the source device 102, as well as with similar components of other devices, to determine based on the computed elapsed time data which device is the intended target device. If the target device 104 is the intended device, the connection mechanism 236 automatically sets up a connection with the source device 102. Note that while connection setup may be generally automatic, some authentication, validation and/or user interaction (e.g., to confirm) may occur, as generally described below.

Figure 3:
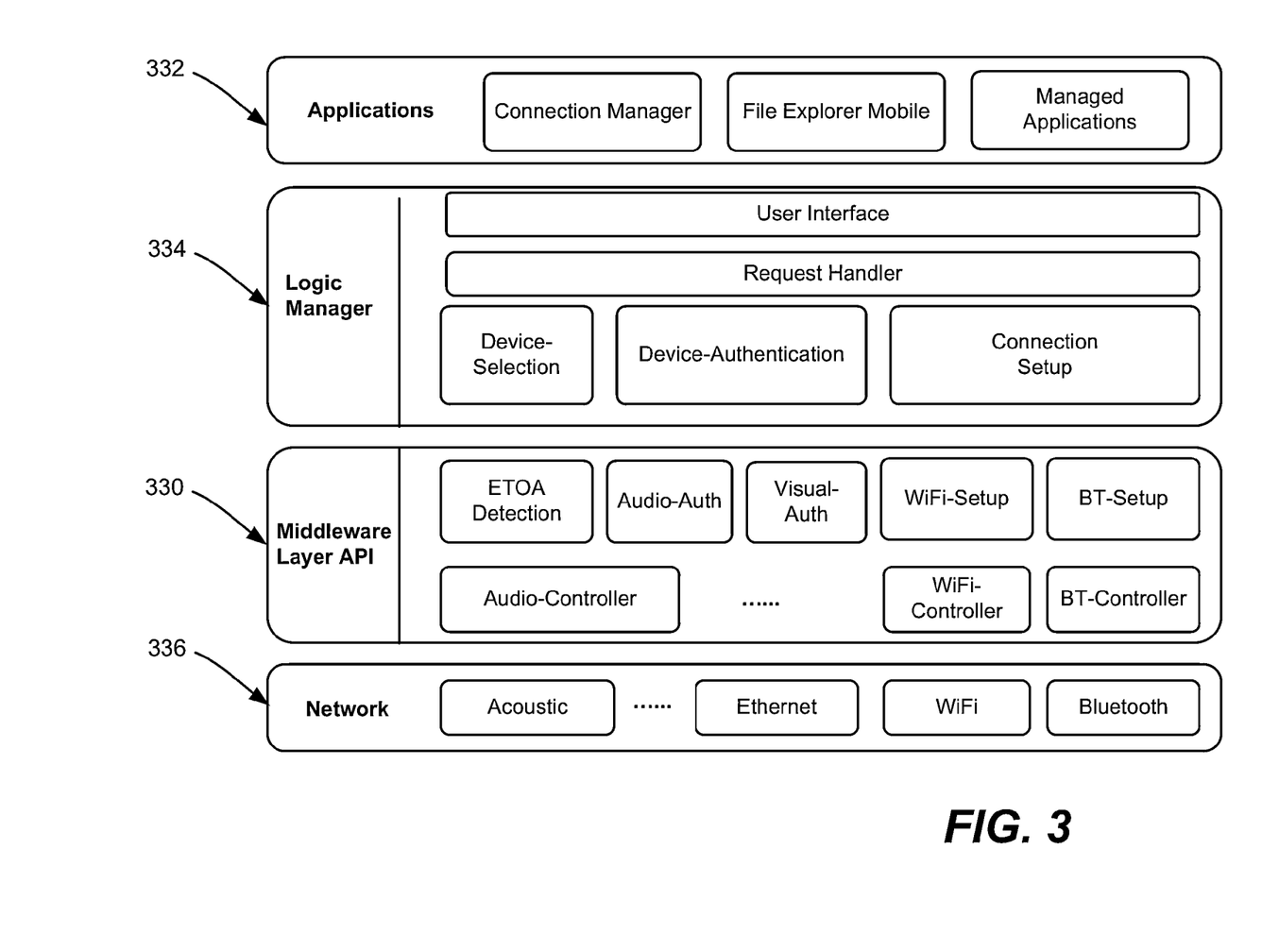
FIG. 3 is a block diagram representing an example software architecture of a device configured for gesturing to select and configure device communication in one example implementation.

A more particular example implementation of a software architecture configured for gesturing to select and configure device communication is represented in FIG. 3. As represented in FIG. 3, the architecture facilitates natural and efficient network setup, such as by including a seamless middleware layer 330 for various applications 332, e.g., file sharing and chatting applications. A logic manager layer 334 handles different application requirements, such as by adopting appropriate modules for selection, authentication and network connection setup. The middleware layer 330 provides functionality for the logic manager layer 334, such as ETOA detection, and Audio, Wi-Fi and Bluetooth controllers. A lower network layer 336 provides the physical communication media.

Figure 4:
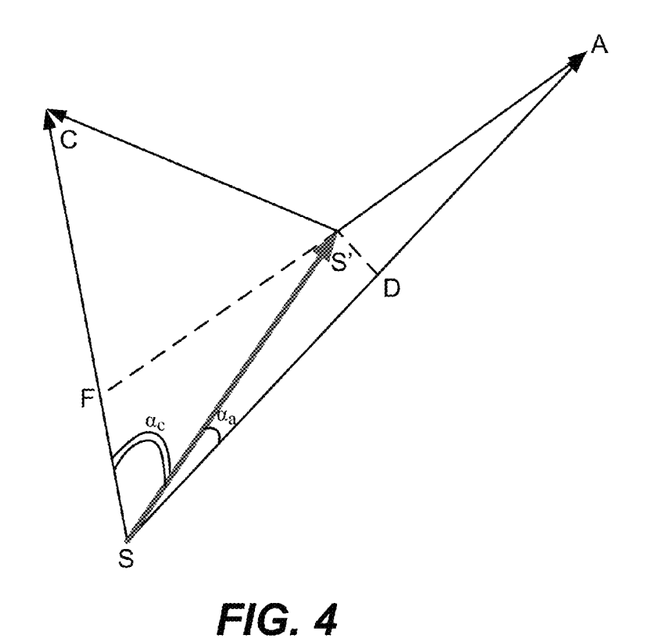
FIG. 4 is a representation of some of the angles that exist between devices with respect to the gesture action of FIG. 1.

Returning to the above example of FIG. 1, as alternatively represented (in part) mathematically in FIG. 4, mathematical analysis indicates why the least elapsed time may be used to determine the pointed-at device. Consider that nodes S, A and C are located in a polar coordinate system, with S as the origin point and the movement direction $\overrightarrow{SS'}$ as the zero-angle direction, and the vector $\overrightarrow{SA}(a,\alpha_a)$ is the direction from S to A with the length represented by a and the angle by $\alpha_a$; the vector $\overrightarrow{SC}(c,\alpha_c)$ may be similarly determined.

As described above, the first sound is emitted at position s and the second sound is emitted at position s'. That is, the spread path of the first and second sound from device S to A, respectively, correspond to $\overrightarrow{SA}$ and $\overrightarrow{S'A}$, whereby the elapsed time of arrival as recorded at A meets:

$$ETOA_a = t_s - (|\overrightarrow{SA}| - |\overrightarrow{S'A}|)/v, \quad (1)$$

where $t_s$ is the elapsed time between the two original sound emissions, constant for all listeners, and v is the speed of sound, which is basically fixed within close proximity. Via the Cosine Theorem, $|\overrightarrow{SA}| - |\overrightarrow{S'A}|$ can be expressed as:

$$f(a,\alpha_a) = |\overrightarrow{SA}| - |\overrightarrow{S'A}| = a - \sqrt{a^2+s^2-2as\cos(\alpha_a)}, \quad (2)$$

where $s = |\overrightarrow{SS'}|$. The function is monotonically-decreasing for $\alpha_a \in [0, \pi]$ and has the maximum value v at $\alpha_a=0$, which is independent of a. Moreover, when a>>s (the range from A is much larger than the movement distance) and $\alpha_a$ is small enough, the changed movement distance $f(a,\alpha_a)$ may be approximated by $f(a,\alpha_a) \approx s \cdot \cos \alpha_a$, that is, the distance change approximates the projection of the movement along the original direction to the listeners.

As a result, the device along (closest to) the actual movement direction has the least elapsed time of arrival. In other words, the device with the minimum projection angle $\alpha_a$ from the movement direction to the original direction to the target device experiences the maximum distance change during the spread of the two acoustic signals, which corresponds to the minimum ETOA, such that the target device is known by comparing the ETOAs among these devices.

In a more extreme situation where more than one device is along the movement direction, or devices are too close to one another, the devices are difficult to distinguish by time difference comparison. From one analysis, node C cannot be distinguished from the target node A unless it meets:

$$\cos(\alpha_a)-err/s \leq \cos(\alpha_c) \leq \cos(\alpha_a)+err/s, \quad (1)$$

where err denotes the distance detection resolution, constrained by the accuracy of TOA detection. In other words, the performance of one selection scheme is determined by the accuracy of the elapsed time detection and the real moving distance between the two beeps in the pointing process, as well as the actual separation between the true target device and its neighboring devices. In general, the larger the moving distance and the smaller the $\alpha_a$ variable, the more accurate the elapsed time measurement, which leads to more robust selection. In practice, a 30 cm moving distance, $\alpha_a=5°$, and one sample point accuracy (in elapsed time measurement, with a 44.1 KHz sampling frequency) has been found to achieve $\alpha_c \in (-14°,14°)$; (note that $\alpha_c \in (-13°,13°)$ if $\alpha_a=0°$), whereby the other nodes outside of this angle range are distinguishable.

Figure 5:
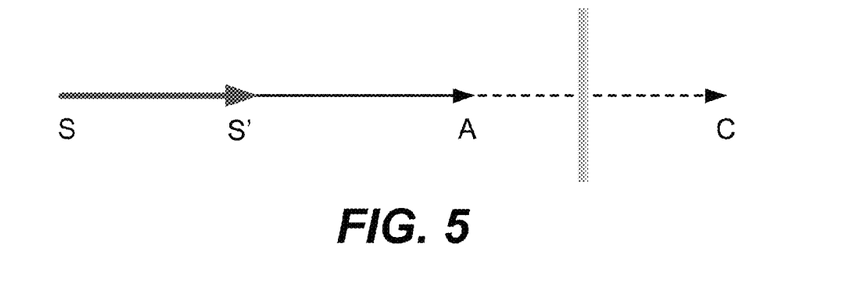
FIG. 5 is a representation of an example scenario in which two target devices are in alignment with the source device with respect to gesturing.

Note that it is somewhat unnatural for a human being to select one person by trying to point toward that one person when present within a crowd. As a result, in practice, candidate devices are more likely located away from each other, whereby the target device is easy to distinguish. However, when devices are generally aligned along the same direction, as represented in FIG. 5 where a device at node C is relatively aligned with a device at node A, the time differences computed at each will be substantially the same, whereby the devices cannot be distinguished from one another by ETOA comparison. Note that some practical time comparison discrepancy threshold may be required, such as to allow for devices having different timing resolution capabilities.

In such an instance, the exemplified selection scheme can consider the devices' distances from the source device S/S' as a secondary selection criterion. To this end, if no device has a minimum ETOA, the device nearest to the source is selected. In one example, the distance from the source may be compared by the received signal strength at A and C, namely in this example, A's sound signal strength (amplitude) is larger than C's if C is farther away from the source S and/or behind an obstacle (such as represented by the gray vertical bar in FIG. 5). The signal strength may be reported by each listening (candidate target) device along with the time difference data, or may be exchanged in a secondary communication between the source device and those listening devices having times that are too close to distinguish.

Figure 6:
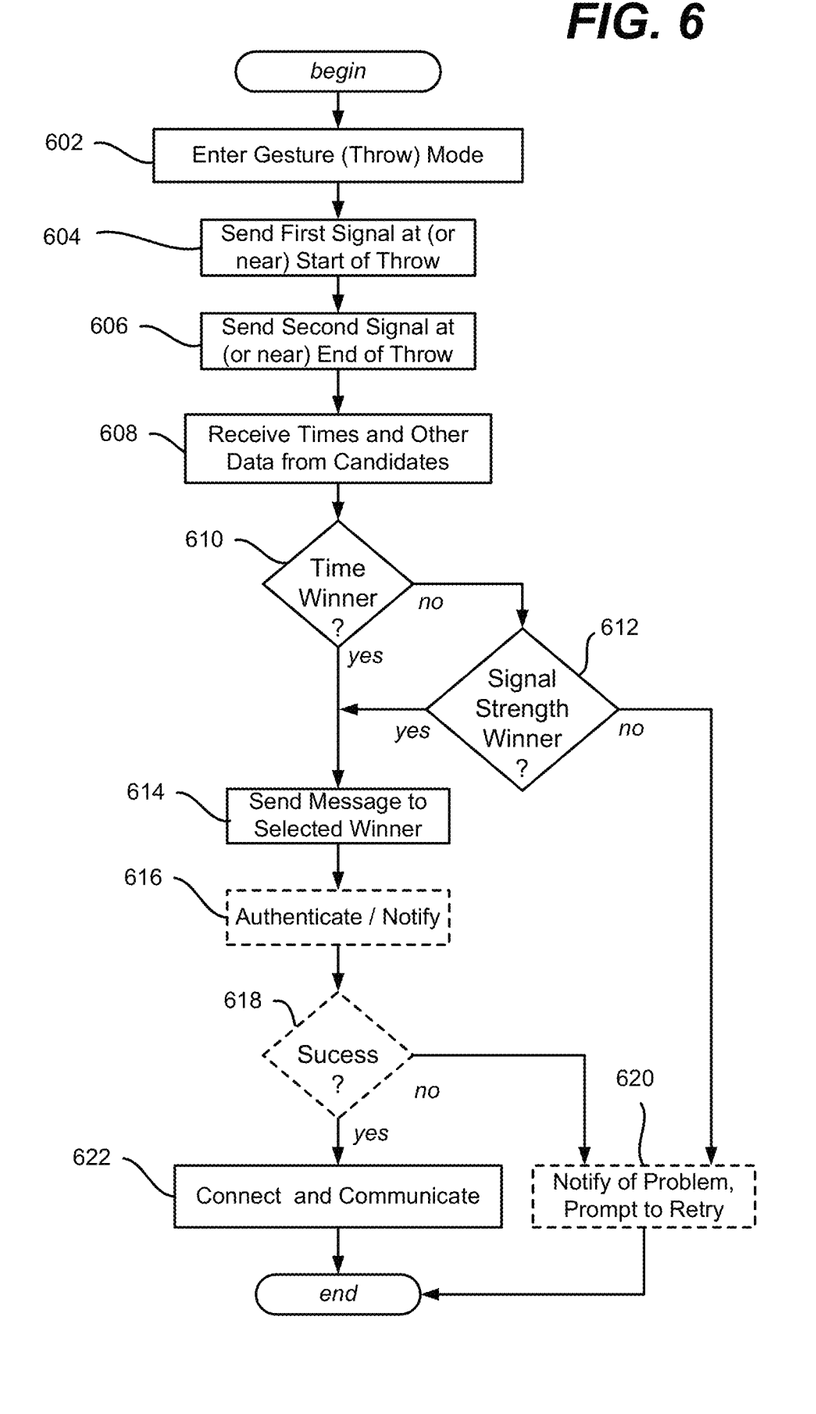
FIG. 6 is a flow diagram representing example steps that may be taken by a source device with respect to gesturing to select a target device and configure communication with that selected device.
Figure 7:
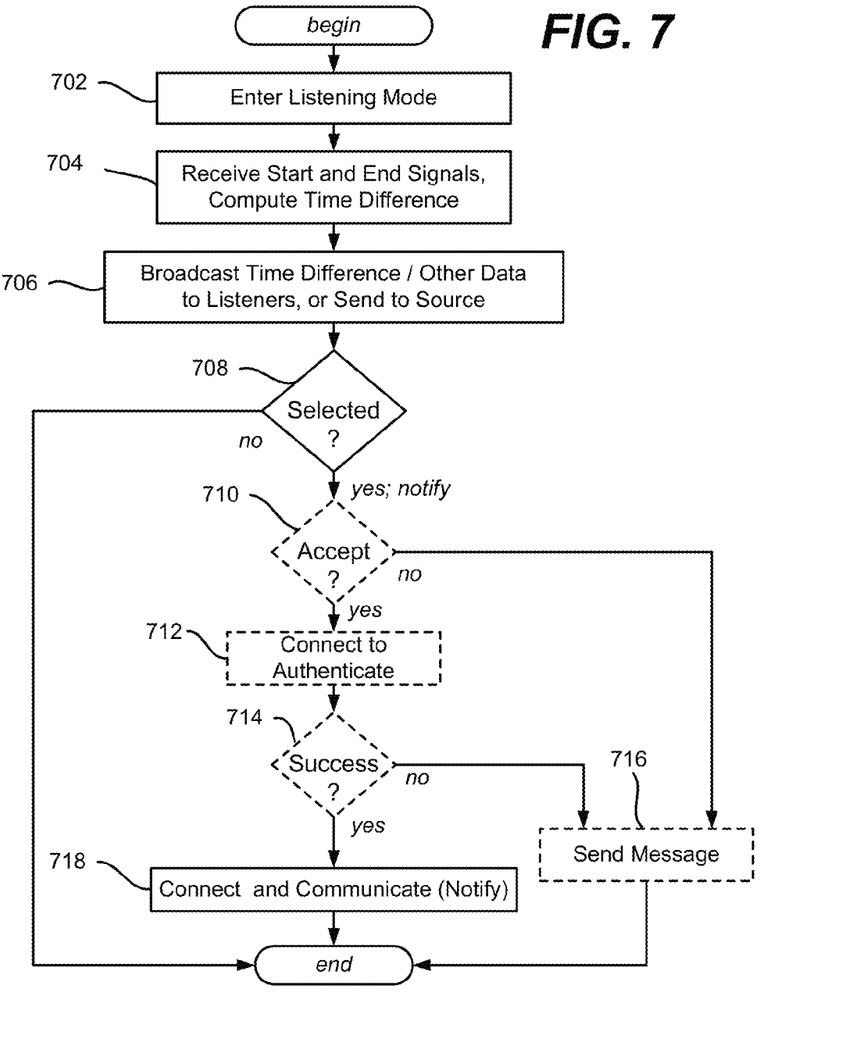
FIG. 7 is a flow diagram representing example steps that may be taken by a listening device with respect to detecting a gesture directed towards selecting a target device for communication.

FIGS. 6 and 7 are flow diagrams representing example operations that may be taken by the source and a candidate device, respectively. Note that in FIGS. 6 and 7, dashed blocks represent optional or mostly optional steps.

In general, at step 602, the user enters the device into a gesture mode, also referred to herein as a "throw" mode. Steps 604 and 606 represent signaling with the first and second signals, in this example at or near the start and end of the gesture, which as described above may be by manual triggering and/or in combination with some timing and/or motion sensing.

Step 608 represents receiving the times (ETOAs) and other data, such as an identifier and possibly signal strength data, from the various candidate devices. Although not explicitly shown in FIG. 6, some reasonable time period may be provided for candidate devices to respond, so that relatively slow or generally busy devices can still participate. In general, such information may be provided in a distributed way, e.g., each candidate listener may broadcast a message with its ETOA and device identification (such as name or address), and each device that can hear these messages, including the source device, can independently determine who is the selected target. Signal strength and other information (e.g., device type information such as cellphone or printer) also may be broadcast, such as for filtering purposes (inclusion or exclusion) as described below. Note that because no device-to-device network may be operational at this time, the data may be sent (e.g., via broadcast or unicast), by modifying a device name or SSID and via scanning, for example.

Step 620 represents evaluating whether any one candidate device has the minimum time, (such as a definite minimum with respect to other devices as described above to allow for different timing capabilities). If so, step 614 sends a message to the winner, which is selected as the target device.

If there is not a clear winner based upon a minimum ETOA, step 612 is executed to determine whether signal strength data is sufficient to determine the winner. If so, step 614 is executed as described above. Otherwise some notification such as a prompt may be given to the user (step 620) to indicate the selection process failed, for example, and possibly to suggest that the user reposition and retry.

Next, the source device 102 attempts to connect with the expected target device 104, corresponding to node A in FIG. 1. A connection probe may be used to authenticate this pairing, as well as verifying the above device selection, as generally represented by steps 616 and 618. For example, because an end-user knows which target device with which a connection is desired, it is straightforward to authenticate the connection, whereupon if successful, the target device may perform some notification action upon receiving the probe request from S, e.g., flash/blink its screen, change background color and/or picture, vibrate in some pattern, make a certain sound, and/or perform another such action or actions depending on the target device's capabilities.

If for some reason the wrong target device is selected and/or authentication otherwise fails, the user may be given an option to retry, for example (step 620). Such an authentication procedure provides an efficient selection verification mechanism to handle situations when the selection scheme does not work correctly (e.g., in extreme alignment/closeness cases), and also effectively fights against attacks such as cheating (e.g., an unintended target device claims that it has the minimum ETOA). In the event that the intended target device is actively seeking a request, such as in a request receiving mode chosen by the user, the target device may send a warning if no such requests are received within a defined period. Note however that other scenarios exist in which users may be interested in receiving data but are not expecting any data in particular; for example, a user may be in a listening mode at a party whereby another user can gesture towards that user in order to signal an interest in meeting them.

When the correct target device is selected/optionally authenticated, this pair of devices sets up a connection between them, e.g., given each other's addresses, existing automatic network configuration and setup such as via Zeroconfig, Windows-Connect-Now and so forth may be used to build a spontaneous connection. Step 622 represents this connection and communication.

FIG. 7 provides a counterpart flow diagram from the target device's perspective, beginning at step 702 where the listening mode is entered. Entering them mode may be manually controlled by the user, may be in response to a message received from the source, or may be automatic, such as regularly running as a background service.

Step 704 represents receiving the signals from the source and computing the time difference. Step 706 broadcasts the time difference to others, so that those with larger time differences may drop out of the process. Note that alternatively, instead of broadcasting, the candidate device may send its time difference only to the source, and then wait to see if selected; if not selected within a certain time, that candidate device may drop out.

Step 708 represents evaluating whether this candidate device was selected as the target device, either by the source or by recognizing that another device had a lower time difference. If not selected, the device drops out, as it was not deemed to be the intended target. Instead, if selected, the user may be notified that the device was selected, whereby the user may be given a chance to accept or reject the selection offer. A message may be sent if the selection attempt is rejected (step 716).

Step 712 represents connecting, at least for the purpose of optional authentication, which may be to provide authentication data to the source, as well as to authenticate the source. If authentication succeeds (step 714) any further connection that is desired is made (e.g., a protocol agreed upon) and communication begins, as represented at step 718, with optional notification to the user; otherwise a message may be sent to the source device indicating that the connection is to be torn down.

It should be noted that although the proposed technology provides a natural and convenient way to select the target mobile device and setup their connection, it can also be applied to much wider scenarios. For example, the technology can be used to select some generally fixed devices as a target, such as a printer, projector, monitor personal computer and even other electric appliances, if they are equipped with communication and sound recording capability.

Note that with respect to a printer, different ways to print are feasible. For example, if a source device has the needed printer driver or the printer (or a computer referenced by the printer) can provide one as part of setting up the connection, the source device may print directly. Alternatively, the source device may point to a computer system, and use the computer system's printer driver and printer coupling to send output to a printer. As another alternative, a printer may detect that a source device is pointing at it, and automatically refer the source device to couple to a computer system coupled to the printer, whereby the source device appears to be directly connecting to the printer, but in actuality is connecting to a computer system that is coupled to the printer, e.g., providing an indirect connection.

Some device type filtering is also feasible. By way of example, consider a user who wants to print something, such as in a busy office environment. The user can indicate a printing intention before making a gesture, whereby devices that are not printers, even if closer and better aligned along the line of motion, will be ignored. For example, if in a printer-seeking mode, the user may point at a printer right past another user's mobile telephone and know that only the printer will connect. The source device may emit different sounds (e.g., different frequencies) for different types of connections whereby unintended devices know to ignore other signals, and/or the potential target devices can indicate their type when they report their timing, with the source device (e.g., via the logic manager layer 334) filtering out those of the wrong type with respect to the intended type.

Turning to more particular implementation examples, one message sent by a source device may comprise POINT(P), which notifies the listeners of the upcoming pointing action and triggers the candidate devices to enter the listening mode such as turn on their microphones. This message may be optional, depending on actual scenarios.

Another message, sent by a candidate device, may comprise a REPORT(R) message, which provides the detected elapsed time that was computed following the pointing operation. As described above, other data such as the received acoustic signal strength, device identification (such as a public key), device type and so forth may be sent via this message. A SELECT(S) message notifies the selected device (and possibly other listeners) which device has been selected in the selection phase.

In general, the technology described herein is primarily used to set up a short-range connection, such as via Bluetooth® or Wi-Fi. As can be readily appreciated, there are some distinctions between Bluetooth® and Wi-Fi implementations, e.g., because a network connection may be formed using the MAC address in Bluetooth® while an SSID as well as the MAC address is used to set up the network connection in a Wi-Fi environment.

In an initialization phase, participating devices turn on the gesture-based connection service. This operation turns on the Wi-Fi or Bluetooth® interface, for use in an ad hoc mode for Wi-Fi or a discoverable mode for Bluetooth®. This operation also turns on the microphone and activates recording capabilities. Note that alternatively, the gesture-based connection service may be implemented as an always running background service, waiting for a POINT message to trigger the selection and connection procedure.

The throw (or point) phase corresponds to the source device emitting signals (e.g., beeps or the like) in conjunction with moving the device appropriately relative to (e.g., towards) the receiving device, e.g., until two beeps are emitted. At the same time, the receiving devices capture the sound and start to detect the beeps. As described above, the throw phase can work with a button press, motion sensing and/or timing, e.g., directly following the initialization phase, and more than two beeps may be used depending on the gesture complexity.

In a report phase, once the receiving devices detect the two beeps, they each stop recording and individually calculate the elapsed time (e.g., in a sample count) between the two beeps. Each listener (candidate device) reports the computed ETOA as well as the device identification (e.g., MAC address(device name) in Bluetooth®, or SSID, MAC Address in Wi-Fi.

In a select phase, the target device scans (e.g., actively or passively) to retrieve the elapsed time measured at the different candidate devices, and thereby determines the target as the device having the minimum elapsed time. The source then sends the SELECT message to the selected target, e.g., via the MAC address of a Bluetooth® device or via the SSID of a Wi-Fi device.

To connect, the selected target device may prompt its user as to whether or not to accept the incoming networking connection request; if accepted, a temporal network is formed. Note that the acceptance may be configured in advance. If the selected device denies the request, the procedure aborts, possibly with a rejection message sent back to the source device. Once a network is formed, the selected device may further notify the user, e.g., by flashing its screen and/or vibrating to confirm the networking. This optional step is informative, such as for better usability.

If device authentication is desired, an authentication process is further executed. If the authentication process fails, the already-formed (at least to an extent) temporal network is torn down.

With respect to connected devices in an existing network), such as in a home or office, devices such as a laptop, printer, projector, fax, television and so forth may be in an existing network via Ethernet and/or Wi-Fi (LAN and/or WLAN) couplings. A pair-wise connection may be desirable for a specific application, such as to connect with a printer or projector, or to control the television or a laptop. Gesture-based device selection facilitates setup of such a pair-wise connection setup.

It should be noted that gesturing may express richer user intentions beyond merely establishing a pair-wise connection. By way of example, a gesture from a music player playing a song to another music player may indicate that the particular song is to be shared, whereby automatic sharing may occur after the connection setup operation. Similarly, automatic data exchanged may be applied to other files, such as video, image, song, calendar, message, document and other files.

Moreover, with additional user interaction, it is possible to connect more than two devices. For example, a source device may point to a first target device, and setup a connection. Before communicating any application data or the like, the source device may point to a second target device, and so on. In this manner, a single source transmission may be directed towards multiple recipient target devices.

Another aspect relates to transferring a connection; for example it is not practical to gesture with some devices, e.g., static or immobile ones. However, a gesture-capable mobile device may act as a remote proxy to build a connection bridge for these devices. For example, to connect two personal computers, or between a laptop computer and a projector, a mobile phone gesture may be used to first connect to one device, and then transfer this connection to another device by a secondary gesture.

In summary, such motion and position-based connectivity greatly simplifies connection setup, yet may be implemented via simple speaker and microphone components, without needing further infrastructure support and/or device synchronization.

Turning to another aspect directed towards device authentication, one consideration is first-place authentication, e.g., a first meeting where there is neither prior context nor common secrets. The spontaneous, ad hoc scenarios exemplified above further exclude a common point of trust (such as PHI or a Trusted Third Party) between the unfamiliar devices to be authenticated.

To this end, an aspect of device authentication attempts to achieve demonstrative or identifiable authentication, that is, the user is sure his or her mobile phone is communicating with the intended targeting device. Note that an out-of-band (OOB) channel may be used to convey some digest information of the sender's public key.

The receiver can thus authenticate the sender by comparing the digest information received from the out-of-band channel and the wireless channel. The audio channel may be chosen due to applicability considerations, e.g., because the microphone and speaker is present in the basic hardware set of any mobile phone.

To achieve reasonable usability and applicability, the authentication process is ideally automated and resilient to environmental noises. Note that although automated, the user may assist, but with limited physical and mental efforts required.

The following representation shows one example authentication procedure, in which A is the sending device and C is the receiving device:

Assume $K_A$ is the public key of A and $M_A$ is the keyed MAC address of A using $K_A$. Initially, A sends $K_A$ to C via the temporarily established wireless channel (or any channel other than the audio channel) and calculates its own digest $h_A$, i.e., the hash of $M_A$. When C receives the public key $K_A$ from the wireless channel at a certain MAC address (easily retrievable), it reproduces $M_A$ by encrypting the retrieved MAC address with the received public key, and calculates the digest $h'_A$ of it. At step 3, A broadcasts $h_A$ through the audio channel using beep interval coding (described below). After receiving $h_A$, C compares $h'_A$ against $h_A$. If they do not agree, C fails the authentication of A and terminates the temporary wireless channel. In this way, once successful, the receiver authenticates the sender's device (e.g., via its MAC address) and its public key $K_A$. To achieve mutual authentication, the procedure is repeated with the sender's and the receiver's roles exchanged.

This authentication protocol is secure as long as an attacker cannot find a second public key and simultaneously fake the MAC address to produce the same digest as that of $M_A$, and is unable to perform an active attack on the audio channel, which can easily be noticed by the user.

As described above, the name as a broadcast channel is leveraged to convey certain information between the pointing device and all potential targets for device selection. However, it is unsuitable for conveying the public key because it has rather limited capacity, e.g., 32 bytes for a Wi-Fi beacon, whereas the public key can be much longer, and because device name scanning takes a relatively long time, which prevents repeated use of the name channel. To work around this, a temporary network may be set up first, e.g., immediately after the selection phase, without any security enforcement; the authentication process is subsequently executed. This temporary network is only used to convey the public key, and will be torn down thereafter.

Note that one threat to key exchange protocols is a "man-in-the-middle" (MiTM) attack where the attacker simultaneously impersonates the sender and the receiver. If an MiTM attack exists, instead of the desired temporary network between A and C, an attacker B impersonates A and C and forms two temporary networks with C and A, respectively. In this case, $K_A$ is actually sent to the attacker B and the public key C received is actually $K_B$, the public key of B. Both public keys were sent from the invisible wireless channel. However, because of audible nature of audio channel and users' attentions, the attacker B cannot broadcast its own digest using the audio channel. Furthermore, with the cryptographic binding of the public key and the MAC address, both A and C will fail the authentication and terminate their temporary networking with the attacker B, respectively.

Authentication requires an exact match of the digests obtained from different channels. If there is a transmission error in the audio channel, the authentication will fail. While this is safe from a security perspective, it impairs the user experience. Consequently, a robust audio channel transmission scheme is desirable. While there are many possible choices of audio codecs that can fulfill the transmission tasks, such codecs are sensitive to environmental noises; in general, the higher bit rate, the more sensitive. Also, such codecs usually produce relatively unpleasant sounds. To improve the robustness of the audio codec with acceptable sounds, beep interval coding is defined herein and used, which as described below maps hexadecimal digits to a fixed interval between two consecutive, fixed length beeps, whereby, for example, the digest of a public key translates into a series of beeps separated by intervals corresponding to the hexadecimal digits of the digest.

More particularly, beep interval coding (BIC) is generally directed towards a shortcut mode that may be used to skip (at least in part) the selection stage, by providing a scheme that may be used to avoid the time-consuming device scanning (10~30 s) or beacon probing (2~5 s) operations, which thus speeds up connection setup through an acoustic out-of-band (OOB) channel. In general, the target device may directly broadcast its MAC address or SSID using beep interval coding via the audio channel, from which the source device may detect that information and use it set up the connection. As will be understood, this alternative is less generic, but works in a typical situation in which only a source and target device are to share a file, e.g., given that in many situations multiple pairs of devices will not likely want to share file simultaneously.

For reliable acoustic communication, beep interval coding may be used, wherein in general, hexadecimal digits or the like are mapped to a fixed interval between two consecutive, fixed length beeps. With this scheme, a device address may be translated into a series of beeps separated by intervals corresponding to the hexadecimal digits. The intervals may be represented by the number of sample points resulting from the analog/digital conversion in the recording.

As can be readily appreciated, beep interval coding depends on the accuracy and the robustness of the interval detection, which is further determined by signal detection. To this end, sound signals that possess good autocorrelation property and use correlation-based detection method are used. For example, pseudo-noise and chirp sound signals are suitable, each of which provides reasonably accurate and robust signal detection in the presence of ambient noise; in one example implementation, chirp sounds are used because they are more pleasing to hear than pseudo-noise sounds. In a typical indoor or outdoor environment, this design achieves one or two sample point detection accuracy.

To increase the robustness, the hexadecimal digit-to-interval mapping scheme may be further relaxed to be more resilient to signal detection errors. For example, hexadecimal digits may be mapped to discontinuous beep intervals such that any interval differs at least T (sample points) from its neighboring intervals. More particularly, a hexadecimal digit n (n=1, 2, . . . ) may be mapped to an interval equal to (n+0.5T) sample points. At the receiving side, the original hex digit is determined to be n if the detected interval is in the range [nT, (n+1)T). A larger T leads to more robustness, however, it correspondingly prolongs the transmission because larger intervals imply more sample points. In one implementation, because of the relatively high sampling frequency (e.g., typically 44.1 kHz and about 44 sample points corresponding to 1 ms), such a tradeoff provides favorable results.

Note that error detection capability may be added to beep interval coding, e.g., by adding a guard interval between any two valid intervals. If the received interval does not fall into a valid interval, the error is concluded to exist. Other channel coding based error protection schemes may be alternatively or additionally applied.

One reason for beep interval coding is robustness in a noisy environment; chirp beeps may be leverages for their noise resiliency. However, chirp beeps have a negative impact on the achievable coding rate, as the coding rate depends on the efficiency of interval representation (in time). Notwithstanding, beeps need to be of certain length (in time) in order to reach a desired level of noise resilience. In general, the longer the beeps, the more noise resiliency, whereby beep interval coding that provides the desired robustness has a relatively low coding rate to. However, because only a relatively small number of bytes are transmitted, a low coding rate that provides robustness is desirable, as people are often mobile and want to exchange data in many different situations.

Exemplary Operating Environment

Figure 8:
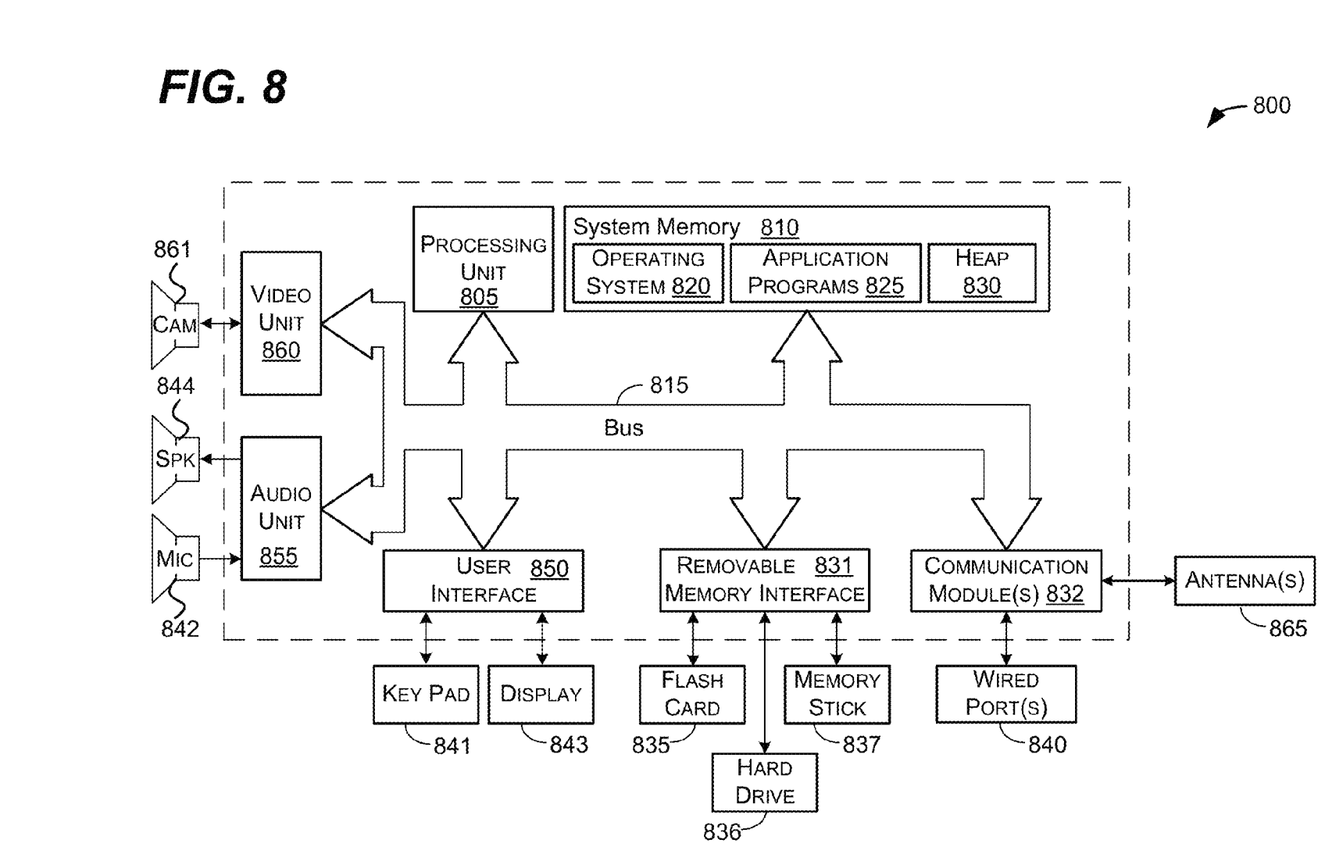
FIG. 8 shows an illustrative example of a computing environment into which various aspects of the present invention may be incorporated.

FIG. 8 illustrates an example of a suitable mobile device 800 on which aspects of the subject matter described herein may be implemented. The mobile device 800 is only one example of a device and is not intended to suggest any limitation as to the scope of use or functionality of aspects of the subject matter described herein. Neither should the mobile device 800 be interpreted as having any dependency or requirement relating to any one or combination of components illustrated in the exemplary mobile device 800.

With reference to FIG. 8, an exemplary device for implementing aspects of the subject matter described herein includes a mobile device 800. In some embodiments, the mobile device 800 comprises a cell phone, a handheld device that allows voice communications with others, some other voice communications device, or the like. In these embodiments, the mobile device 800 may be equipped with a camera for taking pictures, although this may not be required in other embodiments. In other embodiments, the mobile device 800 comprises a personal digital assistant (FDA), hand-held gaming device, notebook computer, printer, appliance including a set-top, media center, or other appliance, other mobile devices, or the like. In yet other embodiments, the mobile device 800 may comprise devices that are generally considered non-mobile such as personal computers, servers, or the like.

Components of the mobile device 800 may include, but are not limited to, a processing unit 805, system memory 810, and a bus 815 that couples various system components including the system memory 810 to the processing unit 805. The bus 815 may include any of several types of bus structures including a memory bus, memory controller, a peripheral bus, and a local bus using any of a variety of bus architectures, and the like. The bus 815 allows data to be transmitted between various components of the mobile device 800.

The mobile device 800 may include a variety of computer-readable media. Computer-readable media can be any available media that can be accessed by the mobile device 800 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the mobile device 800. The term "computer storage media" as used herein refers to a statutory article of manufacture that is not a signal or carrier wave per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, WiMAX, and other wireless media. Combinations of any of the above should also be included within the scope of computer-readable media.

The system memory 810 includes computer storage media in the form of volatile and/or nonvolatile memory and may include read only memory (ROM) and random access memory (RAM). On a mobile device such as a cell phone, operating system code 820 is sometimes included in ROM although, in other embodiments, this is not required. Similarly, application programs 825 are often placed in RAM although again, in other embodiments, application programs may be placed in ROM or in other computer-readable memory. The heap 830 provides memory for state associated with the operating system 820 and the application programs 825. For example, the operating system 820 and application programs 825 may store variables and data structures in the heap 830 during their operations.

The mobile device 800 may also include other removable/non-removable, volatile/nonvolatile memory. By way of example, FIG. 8 illustrates a flash card 835, a hard disk drive 836, and a memory stick 837. The hard disk drive 836 may be miniaturized to fit in a memory slot, for example. The mobile device 800 may interface with these types of non-volatile removable memory via a removable memory interface 831, or may be connected via a universal serial bus (USB), IEEE 8394, one or more of the wired port(s) 840, or antenna(s) 865. In these embodiments, the removable memory devices 835-137 may interface with the mobile device via the communications module(s) 832. In some embodiments, not all of these types of memory may be included on a single mobile device. In other embodiments, one or more of these and other types of removable memory may be included on a single mobile device.

In some embodiments, the hard disk drive 836 may be connected in such a way as to be more permanently attached to the mobile device 800. For example, the hard disk drive 836 may be connected to an interface such as parallel advanced technology attachment (PATA), serial advanced technology attachment (SATA) or otherwise, which may be connected to the bus 815. In such embodiments, removing the hard drive may involve removing a cover of the mobile device 800 and removing screws or other fasteners that connect the hard drive 836 to support structures within the mobile device 800.

The removable memory devices 835-837 and their associated computer storage media, discussed above and illustrated in FIG. 8, provide storage of computer-readable instructions, program modules, data structures, and other data for the mobile device 800. For example, the removable memory device or devices 835-837 may store images taken by the mobile device 800, voice recordings, contact information, programs, data for the programs and so forth.

A user may enter commands and information into the mobile device 800 through input devices such as a key pad 841 and the microphone 842. In some embodiments, the display 843 may be touch-sensitive screen and may allow a user to enter commands and information thereon. The key pad 841 and display 843 may be connected to the processing unit 805 through a user input interface 850 that is coupled to the bus 815, but may also be connected by other interface and bus structures, such as the communications module(s) 832 and wired port(s) 840.

A user may communicate with other users via speaking into the microphone 842 and via text messages that are entered on the key pad 841 or a touch sensitive display 843, for example. The audio unit 855 may provide electrical signals to drive the speaker 844 as well as receive and digitize audio signals received from the microphone 842.

The mobile device 800 may include a video unit 860 that provides signals to drive a camera 861. The video unit 860 may also receive images obtained by the camera 861 and provide these images to the processing unit 805 and/or memory included on the mobile device 800. The images obtained by the camera 861 may comprise video, one or more images that do not form a video, or some combination thereof.

The communication module(s) 832 may provide signals to and receive signals from one or more antenna(s) 865. One of the antenna(s) 865 may transmit and receive messages for a cell phone network. Another antenna may transmit and receive Bluetooth® messages. Yet another antenna (or a shared antenna) may transmit and receive network messages via a wireless Ethernet network standard.

In some embodiments, a single antenna may be used to transmit and/or receive messages for more than one type of network. For example, a single antenna may transmit and receive voice and packet messages.

When operated in a networked environment, the mobile device 800 may connect to one or more remote devices. The remote devices may include a personal computer, a server, a router, a network PC, a cell phone, a peer device or other common network node, and typically includes many or all of the elements described above relative to the mobile device 800.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term server is often used herein, it will be recognized that this term may also encompass a client, a set of one or more processes distributed on one or more computers, one or more stand-alone storage devices, a set of one or more other devices, a combination of one or more of the above, and the like.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method performed on a target device, the method comprising:
   receiving two signals emitted from a source device that are coordinated with a physical movement of the source device that represents a request to establish a spontaneous connection with the target device, where a first of the two signals is coordinated with a beginning portion of the physical movement, and where a second of the two signals is coordinated with an ending portion of the physical movement; and
   establishing, based at least in part on the two received signals, the spontaneous connection between the source device and the target device.

2. The method of claim 1 further comprising computing a difference in time between the receiving the first of the two signals and the receiving the second of the two signals.

3. The method of claim 2 further comprising broadcasting the difference in time.

4. The method of claim 2 further comprising sending the difference in time to the source device.

5. The method of claim 1 further comprising waiting a certain amount of time to be selected by the source device.

6. The method of claim 1 where the establishing is based on being selected by the source device.

7. The method of claim 1 where the establishing includes authenticating.

8. At least one computer storage device storing computer-executable instructions that, when executed by a target device, cause the target device to perform actions comprising:
   receiving two signals emitted from a source device that are coordinated with a physical movement of the source device that represents a request to establish a spontaneous connection with the target device, where a first of the two signals is coordinated with a beginning portion of the physical movement, and where a second of the two signals is coordinated with an ending portion of the physical movement; and
   establishing, based at least in part on the two received signals, the spontaneous connection between the source device and the target device.

9. The at least one computer storage device of claim 8, the actions further comprising computing a difference in time between the receiving the first of the two signals and the receiving the second of the two signals.

10. The at least one computer storage device of claim 9, the actions further comprising broadcasting the difference in time.

11. The at least one computer storage device of claim 9, the actions further comprising sending the difference in time to the source device.

12. The at least one computer storage device of claim 8, the actions further comprising waiting a certain amount of time to be selected by the source device.

13. The at least one computer storage device of claim 8 where the establishing is based on being selected by the source device.

14. The at least one computer storage device of claim 8 where the establishing includes authenticating.

15. A target device comprising at least one software module that together cause the target device to perform actions comprising:
   receiving two signals emitted from a source device that are coordinated with a physical movement of the source device that represents a request to establish a spontaneous connection with the target device, where a first of the two signals is coordinated with a beginning portion of the physical movement, and where a second of the two signals is coordinated with an ending portion of the physical movement; and
   establishing, based at least in part on the two received signals, the spontaneous connection between the source device and the target device.

16. The target device of claim 15, the actions further comprising computing a difference in time between the receiving the first of the two signals and the receiving the second of the two signals.

17. The target device of claim 16, the actions further comprising broadcasting the difference in time.

18. The target device of claim 16, the actions further comprising sending the difference in time to the source device.

19. The target device of claim 15, the actions further comprising waiting a certain amount of time to be selected by the source device.

20. The target device of claim 15 where the establishing is based on being selected by the source device, or where the establishing includes authenticating.

* * * * *